United States Patent [19]

Vennum et al.

[11] Patent Number: 5,341,146

[45] Date of Patent: Aug. 23, 1994

[54] COVERT REMOTE ELECTRONIC WARFARE SIMULATOR

[75] Inventors: Michael D. Vennum; Mark Hynes; Gary Conover, all of Sierra Vista, Ariz.

[73] Assignee: The United States of America as represented by the Secretary of the Army, Washington, D.C.

[21] Appl. No.: 103,268

[22] Filed: Aug. 4, 1993

[51] Int. Cl.$^5$ .................... G01S 7/40; G01S 7/38
[52] U.S. Cl. .................... 342/170; 342/13; 434/2
[58] Field of Search .................... 342/170, 13, 82, 83; 434/2

[56] References Cited

U.S. PATENT DOCUMENTS

| | | | |
|---|---|---|---|
| 4,192,082 | 3/1980 | Deaton et al. | 434/2 |
| 4,666,407 | 5/1987 | Jones | 434/2 |
| 5,010,342 | 4/1991 | Jones, Jr. | 342/169 |
| 5,133,663 | 7/1992 | Willingham et al. | 432/2 |
| 5,134,412 | 7/1992 | Baseghi et al. | 342/169 |
| 5,150,127 | 9/1992 | Aw | 342/169 |

Primary Examiner—John B. Sotomayor
Attorney, Agent, or Firm—Freda L. Krosnick; Frank J. Dynda; Muzio B. Roberto

[57] ABSTRACT

A covert remote electronic warfare simulator is disclosed which includes receiving and signal processing apparatus for incorporating various electronic signal parameters and variables representing propagation effects from the environment borne by a low power control signal for redirection from a "victim" antenna into a "victim" receiving apparatus. The invention includes methods and apparatus for the subsequent replay of stored data representing the resulting signal(s) for data collection and detailed analysis in a laboratory setting. The simulator apparatus is interconnected between a "victim" receiving antenna and a "victim" transceiver to provide a simulated jamming signal.

23 Claims, 2 Drawing Sheets

COVERT REMOTE ELECTRONIC WARFARE SIMULATOR

TECHNICAL FIELD

The present invention relates to electronic warfare simulation, and more particularly to electronic warfare signal generation and testing of jamming, communications, and radar equipment in realistic warfare settings.

BACKGROUND OF THE INVENTION

Electronic warfare simulators for radar and electronic radio frequency emitters are generally known in the art, including U.S. Pat. Nos. 5,010,342 to Jones, Jr.; 5,150,127 to Aw; 5,133,663 to Willingham, et al.; 4,666,407 to Jones; 5,134,412 to Baseghi, et al.; and 4,192,082 to Deaton, et al. Jones, Jr. '342 discloses a radar testing apparatus, while Aw, Willingham, et al., and Jones '407 disclose simulators which include the ability to reproduce various radar signatures; Deaton, et al. and Baseghi, et al. teach training simulators.

Jones, Jr. '342 discloses a portable radar testing apparatus which, when connected to a transmitting means (such as a waveguide horn antenna), provides a radar signal to test a radar receiver or other electronic warfare equipment.

Aw discloses a radar signature simulator for use in electronic warfare and training of intercept operators. Recorded video portions of radar signatures as they appear at the point of intercept on a video tape recorder are simply played back to produce video signals, which are transmitted to a receiving antenna.

Willingham, et al. discloses a portable radar simulator which, when connected to a transmitting means, such as magnetron generated microwave threat transmitter, simulates up to 2048 preprogrammed radar signatures.

Jones '407 discloses a radar signature simulator for producing a pattern of radar signatures and transmitting them to a receiver during training.

Baseghi, et al. discloses an apparatus and method for simulating radio frequency emitters in order to train electronic warfare radar receiver operators.

Deaton, et al. discloses an electronic warfare simulator system in which a computer produces simulated radar signals that duplicate the characteristics of real world radar emitters. These characteristic signals are inputted to an electronic pulse analyzer in active electronic warfare equipment.

Other simulator systems are known which include, generally, individual signal sources capable of operation over a broad frequency range of from about 10 kilohertz to about 20 gigahertz, separate signal modulation apparatus capable of a wide range of modulation types, individual signal receivers and separate received-signal processing equipment, electronic radiation equipment, different radiating and receiving antennas, and multiple cables and waveguides for conveying equipment power and signals to and from the respective antennas. While such equipment is often commercially available, additional equipment units may be custom fabricated and specially supplied.

Individual units of equipment for both laboratory and field electronic warfare test facilities are known. These units can be assembled to form facilities dedicated to developmental testing, determination of electromagnetic compatibility and electromagnetic vulnerability, operational testing, and exploitation of communications-electronics equipment. Rather than being dedicated to simulating specific electronic warfare threat hardware, these electronic warfare facilities are generalized, reconfigurable systems.

The electronic warfare equipment consists of semi-trailer-van-mounted jamming systems including computer-controlled waveform generation and radio frequency modules. These jamming systems include the capability of generating a variety of waveforms for radar simulation, radar jamming, communications simulation, and communications jamming for a wide range of frequencies from, for example, 100 megahertz through 15.4 gigahertz. The lower frequency limit may be extensible to 10 kHz with ancillary equipment. Power output (at the antenna) may range from about 1000 watts for the low frequency bands to 200 watts or less at the higher frequencies. Actual effective radiated power, of course, is dependent upon the antenna system selected.

The known van-mounted jamming equipment units may be configured and operated automatically from a computer control console; controlled remotely via microwave, hardwire, or fiber optics link; or manually configured and operated for non-standard waveforms. Antenna positioning systems are desirable to position the jamming antennas in azimuth and elevation.

The van-mounted equipment units may also include radio frequency (RF) command and control communications systems, timing receivers, and RF signal and waveform monitoring equipment, such as spectrum analyzers, frequency counters and oscilloscopes. Such equipment conventionally requires heavy duty power sources, such as 3-phase, 4-wire, 60-Hz power generators with 120 volts alternating current line-to-common, or 208 volts alternating current line-to-line, at 30 kilowatts or greater capacity. When van-mounted for the mobility needed for field testing, very large mobile generators are required.

Known jammer systems may also be palletized, with consequent limitations in power, frequency range, and other operating characteristics. They may be configured to be operated from a helicopter, or they may be trailer-mounted for ground deployment.

Typical antenna systems required for ground deployment and operation for either pelletized or van-mounted systems include, for example, a 30-foot, outrigger-stabilized, erectable antenna tower as part of the installation.

Various modulation forms may be used. Operation of the jammers may be computer controlled via keyboard-/monitor from a computer. Jamming signals may be monitored from one or more frequency counters and power meters. Jammer signal data may be monitored and stored on diskettes in operator-selectable time increments of up to about 60 seconds. Data such as the following can normally be recorded: center frequency, programmed effective radiated power (ERP), spot noise deviation, modulation file name, transmission time, comb generator frequencies enabled, calibration status and/or RF power output versus time.

In addition, pelletized jammer equipment may contain command and control communications. Power requirement for airborne use is typically 28 volts direct current at 260 amperes. For ground use, a mobile single-phase, 60-Hz, 120 volts alternating current, 10-kilowatt capacity generator is typically required.

The known simulation equipment when deployed for field test and information gathering will typically include at least one large semi-trailer van equipped to provide test signal waveform generation (which may be computer controlled) and high power radio frequency emissions capability to one or more large antenna structures, which are normally directional and capable of orientation in both azimuth and elevation, as well as the usual command and control communications. A receiving antenna and at least one additional large semi-trailer van equipped for signal reception and processing is required. Since high operating power is required, high power mobile generating sources are also required for mobility.

The known electronic warfare simulators for radar and electronic radio frequency emitters are thus large and unwieldy, and require substantial operating power sources, which are also unwieldy. The prior art methods of operating electronic warfare simulators for radar and electronic radio frequency emitters are limited in their ability to replicate certain unknown signal parameters and uncontrollable variables from the benign and-/or battlefield environments. They are also incapable of receive operation mode through the use of direct injection of jamming signals into a "victim" receiver, and are unable to immediately incorporate resulting benign environment effects of the desired signal before the jamming as well as on the jamming signal itself by recording such effects. They are further unable to replay these recorded characteristics and signals in a laboratory environment to develop statistically significant databases.

SUMMARY OF THE INVENTION

The present invention includes simulation method and apparatus directed to incorporating various electronic signal parameters and variables from the battlefield environment and from the benign environment with low power control signals for redirection into the "victim" receiving apparatus. The present invention is also directed to methods and apparatus for the storage and subsequent retrieval and replay of the resulting time tagged signal(s) for data collection and detailed analysis as in a laboratory setting. This invention is thus directed to a covert remote electronic warfare simulator apparatus which is interconnected between a "victim" receiving antenna and a "victim" transceiver to provide a simulated jamming signal.

The covert remote electronic warfare simulator apparatus includes a jamming waveform source and time of day information. A mass read/write data storage device provides stored time of day information, as well as a digital word bearing information related to the actual propagated signal, in which the digital word includes information concerning environmental effects such as fading, atmospheric and multipath effects. The mass data storage device is also used to store experimental field information for later retrieval and data collection and detailed data analysis in a laboratory situation.

Two major modes of operation are thus available: a field test mode in which the system time-tags, records, and controls all the jamming signals sent to a "victim" receiver with all the fading and environmental distortion characteristics included for data storage and retrieval; and a replication mode in which the stored field jamming test of the system is replayed back in a laboratory environment for further analysis.

The method for field testing includes the steps of both providing a low power desired signal to the "victim" antenna and propagating a low level control signal to the "victim" antenna. That low power propagated signal takes the place of the high power jamming signal required in the prior art method, reducing overall power requirements, equipment complexity and facility field deployment. Those signals are then directed to the "victim" receiving apparatus through the covert remote electronic warfare simulator apparatus.

By storing the real world propagation effects with real-time data tags, the stored data may be retrieved and subsequently recreated in a laboratory setting for full laboratory analysis.

Briefly described, the aforementioned objects are accomplished according to the invention by providing a covert remote electronic warfare simulator apparatus in which the desired and the propagated control signals are separated by an input diplexer, the propagated control signal is processed to produce a time-varying jamming signal. The desired signal is then recombined with the jamming signal. The received, as-propagated control signal may be amplified to a useful level for further modification during processing. The amplified control signal is mixed with another frequency to produce an intermediate frequency (IF) signal, which is detected, measured, quantized and converted to a digital word related to the detected power level of the time-varying control signal reflecting the propagation effects. The digital word is then corrected for signal losses incurred by the control signal within the covert remote electronic warfare simulator apparatus.

The digital word is periodically adjusted according to a desired jamming system modification at very high rates determined by a timing or clock signal. The desired jamming modification information is provided to an attenuator (preferably a digital attenuator) by the controller. That signal can be adjusted through reference to stored data representative of predetermined environmental signal effects. The stored environmental signal effect data may be time-tagged for later retrieval, reproduction and/or analysis. An unmodified jamming signal is generated, then passed through the attenuator where it is modified according to the environmental signal effects to produce a jamming signal. That jamming signal is then combined with the received desired signal via an output diplexer and output to the "victim" receiver.

A field jamming test is replicated by a method incorporating the foregoing apparatus and many of those steps. The stored, prerecorded and time-tagged control signals reflecting the environmental signal effect data are retrieved through the controller to provide an exact reproduction of the field test injected jamming signal. The controller feeds the digital word to the digital attenuator to control the input power level of the jamming RF signal to the output diplexer, which combines the prerecorded environmental-effect signal variation with the jamming signal for output to the "victim" receiver. Since the effects of the benign environment were recorded and time-tagged when stored, all or any part of the field test can be precisely replicated in a laboratory environment by feeding the signals representing the benign environment into the output diplexer.

The methods and apparatus of the present invention include several significant features: the ability to duplicate otherwise unknown signal parameters and uncontrollable variables from the battlefield, receive operation through use of direct injection of jamming signals into the "victim" receiver, incorporation of the resulting effects of the benign environment on the desired signals (before injection of the jamming signal) as well as on the jamming signal by recording them, and the ability to retrieve and replay those recorded characteristics and signals in a laboratory environment to develop a statistically significant collection of data.

The present invention thus overcomes many prior art problems including large size, limited power output, inability to measure the benign environment or its effects on the desired jamming signal, unintentional interference with other RF systems not undergoing testing, and non-repeatability of the test and test results.

In view of the foregoing limitations and shortcomings of the prior art devices, as well as other disadvantages not specifically mentioned above, it should be apparent that there still exists a need in the art for an improved method and apparatus for covert remote electronic warfare test and simulation. It is, therefore, a primary object of this invention to fulfill that need by providing signal reception and jamming modification apparatus providing a controllably modified jamming signal output to a "victim" receiver, and methods for operating that apparatus in both field test and laboratory analysis modes.

With the foregoing and other objects, advantages, and features of the invention which will become hereinafter apparent, the nature of the invention may be more clearly understood by reference to the following detailed description of the invention, the appended claims, and to the several views illustrated in the attached drawings.

BRIEF DESCRIPTION OF THE DRAWING FIGURES

The present invention is illustrated in the attached drawing figures, in which like reference numbers represent like elements in the views:

FIG. 1 is a simple equipment block diagram of an exemplary embodiment of the covert remote electronic warfare simulator according to the present invention; and FIG. 2 is a simplified procedural block diagram illustrating the steps for carrying out an example of the claimed method.

DETAILED DESCRIPTION OF THE INVENTION

Figure 1:
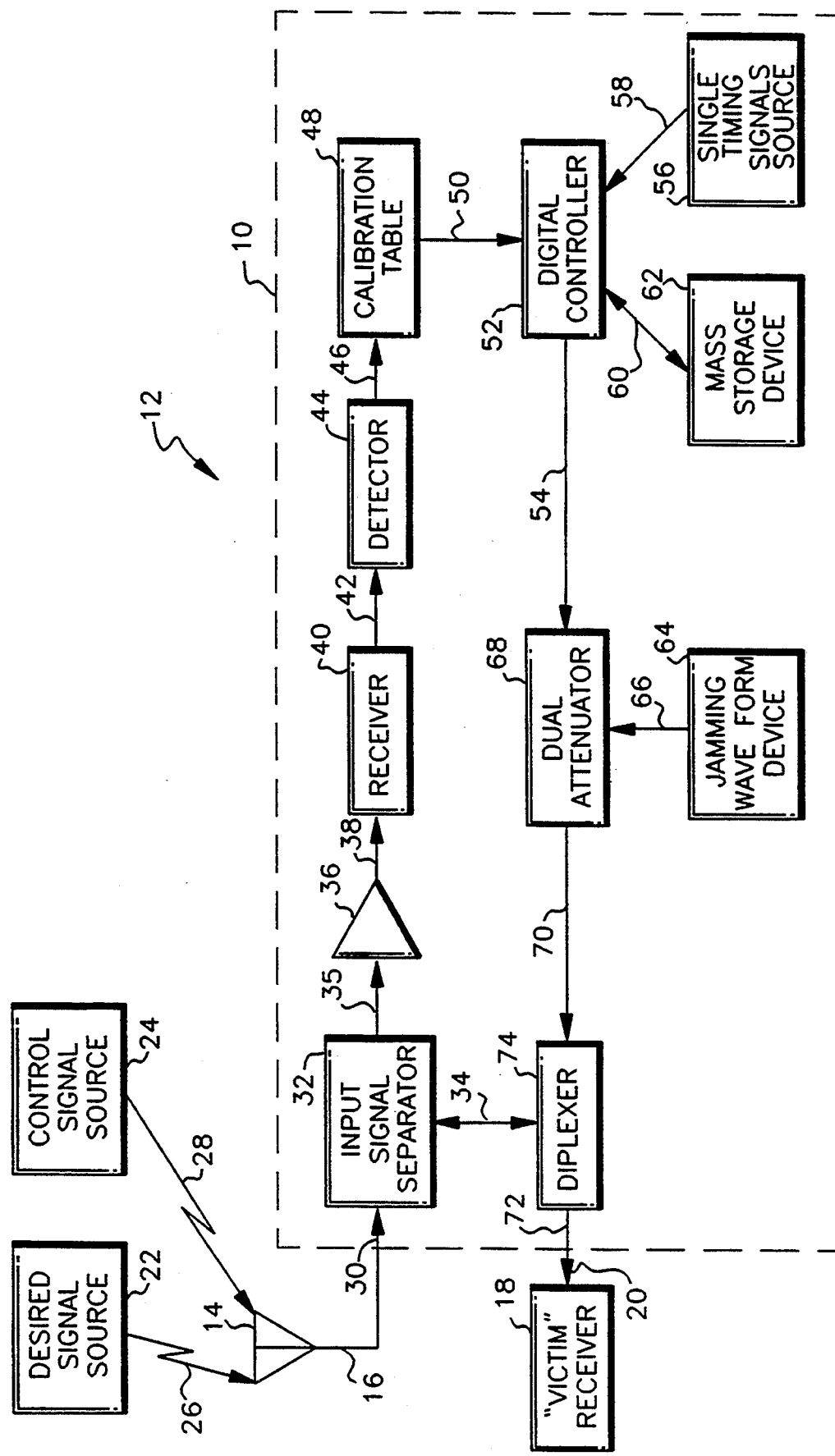

The present covert remote electronic warfare simulation invention 10 is shown in FIG. 1 with a field test system 12 of the type with which it may be used. External to the present invention are the "victim" antenna 14, a feedline 16, the "victim" receiver 18, a feedline 20 to the "victim" receiver, a desired signal source 22, and a control signal source 24. The "victim" antenna can be any appropriate antenna as known to those persons having ordinary skill in the art. For the present embodiment, the desired signal source produces the desired signal 26 which is intended for the "victim" receiver before incorporating the jamming effects thereon, while the control signal source produces a low power signal 28, preferably a continuous wave signal (CW) from which the environmental propagation effects can be extracted. The feedline 16 carries the received signal 30 from the "victim" antenna 14 to the covert remote electronic warfare simulator 10. Any conventional signal carrying equipment, suitable to the received frequency of interest, can be used for the feedlines 16 and 20. While conventional coaxial cable or the equivalent can be used for the feedlines 16, 20 at lower frequencies, it is contemplated that a conventional waveguide will be used at higher frequency wavelengths, as known to a person having ordinary skill in the art.

The covert remote electronic warfare simulator 10 apparatus itself includes an input signal separator 32 for splitting a first signal S1 34 representative of the desired signal 26 from a second signal S2 35 representative of the control signal 28 as received at the antenna. The first signal S1 34 is unjammed; it is conveyed to an output combiner as described hereinafter.

The received control signal S2 35 ordinarily will require amplification to higher levels for use in the signal processing stages which follow; therefore, an amplifier 36, which may be a low noise amplifier for improved simulation, is provided to couple an amplified S2 signal 38 to a subsequent receiver 40 or equivalent apparatus including a hetrodyne or other mixer (not shown), which in turn provides an intermediate frequency (IF) S5 42 output having a carrier frequency and the S2 control signal as modulation information thereof. Since the received control signal includes the actual environmental effects on the transmitted control signal, the modulation information is therefore directly related to those environmental effects.

A detector 44 is provided to extract the received control signal modulation information from the carrier frequency. A power detector is used to accurately reflect the environmental effects being extracted from the IF signal S5 42. The received and extracted control signal modulation information is digitized and quantized, and converted into a digital word 46 in the detector 44. This digital word $P_{cw}$ 46 is then corrected to accommodate processing gains (losses) using a calibration table 48 as required for further processing. The corrected digital word output $P_{cw}$ 50 is subsequently used as the initial setting for indirectly adjusting the jamming signal, as will be described hereinafter. The corrected digital word output $P_{cw}$ 50 is communicated to a digital controller 52.

The controller 52 incorporates several functions, including adjustment of the digital word by a power factor $P_{scale}$ representing the difference between the level of the transmitted CW control signal S1 28 and the level of the desired jammer 26 signal being simulated. The controller 52 generates a new digital word $P_j$ 54. The controller 52 determines $P_j$ according to Equation 1:

$$P_j = P_{cw} + P_{scale} \qquad 1$$

wherein $P_{cw}$ is the corrected digital word 46, and $P_{scale}$ is the difference between signal S1 28 and the desired jamming signal being simulated.

The controller 52 communicates with a timing device 56 which produces a clocked timing signal and a time of day signal on line 58. The clocked timing signal can be of substantially any frequency suitable for a realistic recreation of the fastest components of fading and other environmental effects on the signal. A clock rate in the range of about 1000 to about 10,000 pulses per second and higher can be used; a 10,000 Hertz pulse rate is used in this embodiment. Both the timing signal and the time of day information may be generated in a single timing signals source, 56.

The controller 52 also communicates via a line 60 with a read/write mass storage device 62 to enable the storage and retrieval of time tagged control signals for replication of the signal which would have been received by the system under test, which is also used for controlling the jamming level output. The digital word $P_j$ on line 54 is communicated to and controls the adjustment of a jamming signal S3 produced by a jamming waveform source 64 on line 66. The adjustment is accomplished in this embodiment by a digital attenuator 68, which is regulated by the digital word $P_j$ output by the controller 52 on line 54. Thus, the jamming signal S3 66 is modified and adjusted at a very high rate of about 10,000 times per second to effectively and realistically simulate in a jamming signal from a jamming platform a propagated signal as received at the system under test.

The line 70 carries the simulated jamming signal S3 to the signal combining apparatus, where it is combined with the as-received desired signal S1 on line 34, and output on line 72 to the "victim" receiver 20. A diplexer 74 is used for signal combining in the present embodiment. The "victim" receiver can be any appropriate receiver as known to those persons having ordinary skill in the art.

Figure 2:
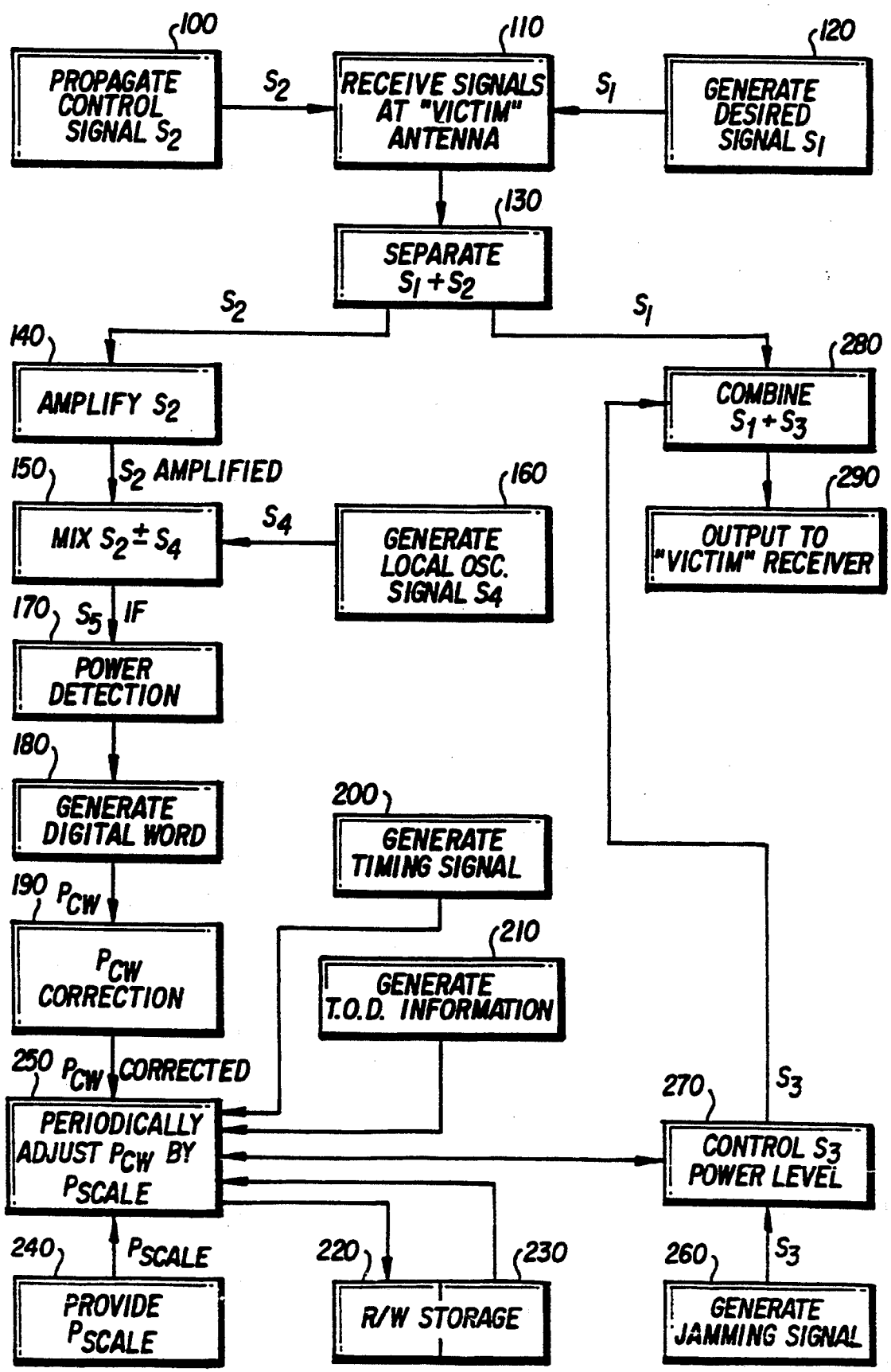

The apparatus of FIG. 1 is used in the field test mode according to the steps illustrated diagrammatically in FIG. 2. Initially, a desired signal S1 is generated and fed to the "victim" antenna 14 at block 120 and a control signal S2 is propagated from a low power remote source 24 at block 100, which may be airborne or surface deployed, and directed to the "victim" antenna. That control signal is preferably a CW signal.

The signals S1 and S2 are received by the "victim" antenna, block 110, and separated, at block 130, within the covert remote electronic warfare simulator 10. The separate desired signal S1 is subsequently combined with a jamming signal, as will be described hereinafter. The received control signal S2, bearing the environmental effects of the propagation, is amplified, if required and as illustrated in block 140, to useful signal 38 levels.

The received control signal S2 is mixed, at block 150, such as by hetrodyning in a receiver 40 or other mixer, with a local oscillator signal S4 generated at block 160 in order to produce an IF signal S5 42. That IF signal S5 thus includes a replica of the actual signal effects produced by propagation in the benign environment of the control signal S1. The IF signal detection of S5 is accomplished at block 170 in a power detector to eliminate the IF carrier signal and extract the received control signal modulation information from the IF carrier frequency in order to accurately reflect the environmental effects borne by the IF signal S5 42. The extracted control signal modulation information is digitized and quantized, and converted into a digital word $P_{cw}$, at block 180, in the detector 44.

Since the covert electronic warfare simulator 10 necessarily includes signal gains and losses, the digital word $P_{cw}$ from the step illustrated by block 180 is adjusted to correct for those gains and losses at block 190 in order to produce a corrected $P_{cw}$ signal. A calibration table 48 is used for that adjustment.

A timing clock signal of about 10,000 Hertz, as in this embodiment, which may be lower or higher, is generated as illustrated at block 200. The step of generating the time of day information is shown at block 210. As previously described, both the timing signal and the time of day information may be generated in a single timing signals source 56. A read/write mass storage device 62 enables the storage (block 220) and retrieval (block 230) of time-tagged control signals for replication of the signal which would have been received by the system under test, as is described above. Since the control signal level and the jamming signal level being simulated usually differ, a predetermined correction adjustment $P_{scale}$ reflecting that difference is supplied to the controller 52 at block 240. The adjusted $P_{cw}$ signal is then periodically modified and adjusted at a rapid rate, in block 250, based on various input and/or output information from the steps illustrated at blocks 190, 200, 210, 220, 230, and 240. The digital word $P_j$ is produced according to Equation 1, described above.

A jamming signal S3 66 is generated at block 260. The jamming signal S3 is modified as illustrated in block 270 in a digital attenuator 68 by the controller digital word $P_j$ output from step 250 to simulate the effects detected from the propagated control signal S2. The control signal $P_j$ produced at step 250 is used to control the jamming signal to simulate those environmental effects.

At the step illustrated by block 280, the desired signal S1 from the previously described separation step illustrated in block 130 is combined with the modified, level-adjusted jamming signal S3 to produce the simulated jamming signal, which is output to the "victim" receiver at block 290.

The covert remote electronic warfare simulator may also be used in the laboratory environment in order to replicate a given field test or tests. In the field test replication mode, the prerecorded (e.g. the control signals time-tagged and stored as illustrated in block 220 above) are retrieved (block 230) and played back through the controller 52 to provide an exact replication of the injected jamming signal. The propagation effects of the benign environment on the desired signal previously recorded and time-tagged can be retrieved and thus the entire field test can be accurately replicated in a laboratory environment.

To accomplish such a replication, the benign environment data is recreated and fed into the combiner, diplexer 74. The controller 52 sends the digital control word $P_j$ 54 to the digitally controlled attenuator 68 which controls the input power level of the radio frequency (RF) jamming signal to the diplexer. The diplexer thus combines the prerecorded benign environment information with the jamming RF signal and sends both of those signals to the "victim" transceiver 18.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

We claim:

1. The method of electronic warfare signal simulation comprising the steps of:
   generating a first signal as a desired signal;
   generating and propagating by radio transmission a second, low power signal over a distance as a control signal;
   receiving the first and second signals with a "victim" antenna;
   separating the first and second signals;
   converting the second signal to one or more digital words having time-varying values representative of the environmental effects on the propagated second signal;

generating a third signal as a jamming signal;

periodically adjusting the third signal strength according to the value of the digital words;

combining the first signal and the third signal to produce a simulated jamming signal; and outputting the simulated jamming signal to a "victim" receiver.

2. The method of claim 1, further including generation of a timing frequency to clock the periodic adjustment.

3. The method of claim 2, wherein the periodic adjustment occurs at a rate in excess of 5 kilohertz.

4. The method of claim 2, wherein the periodic adjustment occurs at a rate of about 10 kilohertz.

5. The method of claim 1, in which at least the receiving, separating, and converting steps include equipment gain, further including the step of correcting the digital word value to accommodate variations of the second signal due to equipment gain.

6. The method of claim 1, further including generation of Time of Day information.

7. The method of claim 6, wherein the conversion step includes generating a fourth signal as an oscillator signal, hetrodyning the second signal and the oscillator signal to produce an intermediate frequency signal as a fifth signal, and detecting the fifth signal to produce a time-varying signal $P_{cw}$.

8. The method of claim 7, wherein the conversion step further includes the step of generating a scale value $P_{scale}$ related to the difference between the first signal and the value of a desired propagated signal, and adjusting the signal $P_{cw}$ by the scale value $P_{scale}$ to produce a digital word $P_j$.

9. The method of claim 8, further including the step of associating the digital word $P_j$ and the Time of Day information and storing the associated digital word and the Time of Day information together in mass storage.

10. The method of claim 9, followed by the step of subsequently recalling the stored digital word $P_j$ and the associated Time of Day information, generating a first signal as a desired signal; generating a third signal as a jamming signal, periodically adjusting the third signal strength according to the value of the digital word, combining the first signal and the third signal to produce a simulated jamming signal; and outputting the simulated jamming signal to a "victim" receiver.

11. The method of claim 10, further including the step of laboratory analysis of the simulated jamming signal.

12. The method of claim 1, wherein the second signal is a continuous-wave signal.

13. Apparatus for electronic warfare signal simulation, comprising:

means for generating a first signal as a desired signal;

means for generating and propagating by radio transmission a second, low power signal over a distance as a control signal;

a "victim" antenna adapted for receiving the first and second signals;

means for separating the first and second signals;

means for converting the second signal to one or more digital words having time-varying values representative of the environmental effects on the propagated second signal;

oscillator means for generating a third signal as a jamming signal;

means for periodically adjusting the third signal strength according to the value of the digital word, comprising a controller and a digital attenuator; and means for combining the first signal and the third signal to produce a simulated jamming signal.

14. The electronic warfare signal simulation apparatus of claim 13, further including means for generating a fourth signal as an oscillator signal, means for hetrodyning the second signal and the oscillator signal, means for hetrodyning and the second signal and the oscillator signal to produce an intermediate frequency signal a fifth signal, and means for detecting the fifth signal to produce a time-varying signal $P_{cw}$.

15. The electronic warfare signal simulation apparatus of claim 14, further including means for generating a scale value $P_{scale}$ related to the difference between the first signal and the value of a desired propagated signal, and means for adjusting the signal $P_{cw}$ by the scale value $P_{scale}$ to produce a digital word $P_j$.

16. The electronic warfare signal simulation apparatus of claim 15, further including means for generating Time of Day information.

17. The electronic warfare signal simulation apparatus of claim 16, further including mass storage means for storing the digital word $P_j$ and Time of Day information associated therewith together.

18. The electronic warfare signal simulation apparatus of claim 13, wherein said oscillator means utilizes a clock frequency above 5 kilohertz for controlling the rate at which the third signal is adjusted according to the digital word.

19. The electronic warfare signal simulation apparatus of claim 13, further including means for generating a clock frequency of about 10 kilohertz for controlling the rate at which the third signal is adjusted according to the digital word.

20. The electronic warfare signal simulation apparatus of claim 13, further including low noise amplifier means for amplifying the received first signal.

21. The electronic warfare signal simulation apparatus of claim 13 wherein said second signal is a continuous wave signal.

22. The electronic warfare signal simulation apparatus of claim 13, wherein the first signal generating means is a ground based platform.

23. The electronic warfare signal simulation apparatus of claim 13, wherein the first signal generating means is an airborne platform.

* * * * *